United States Patent Office 3,517,073
Patented June 23, 1970

---

3,517,073
SYNTHESIS OF A HYDROXY GROUP-CONTAINING POLYCYCLIC AROMATIC FUSED RING COMPOUND
Donald L. Fields, Rochester, N.Y., assignor to Eastman Kodak Company, Rochester, N.Y., a corporation of New Jersey
No Drawing. Filed June 13, 1967, Ser. No. 645,637
Int. Cl. C07c 37/00
U.S. Cl. 260—621        4 Claims

---

ABSTRACT OF THE DISCLOSURE 2-naphthol or anthracene is obtained from a 4a-azoniaanthracene salt by condensation of the salt with 1,1-diethoxyethylene or bonzyne, respectively, hydrogenation of the product to form at least a tetrahydroanthracene, and hydrolysis, or thermolysis, respectively, as is illustrated by the equations:

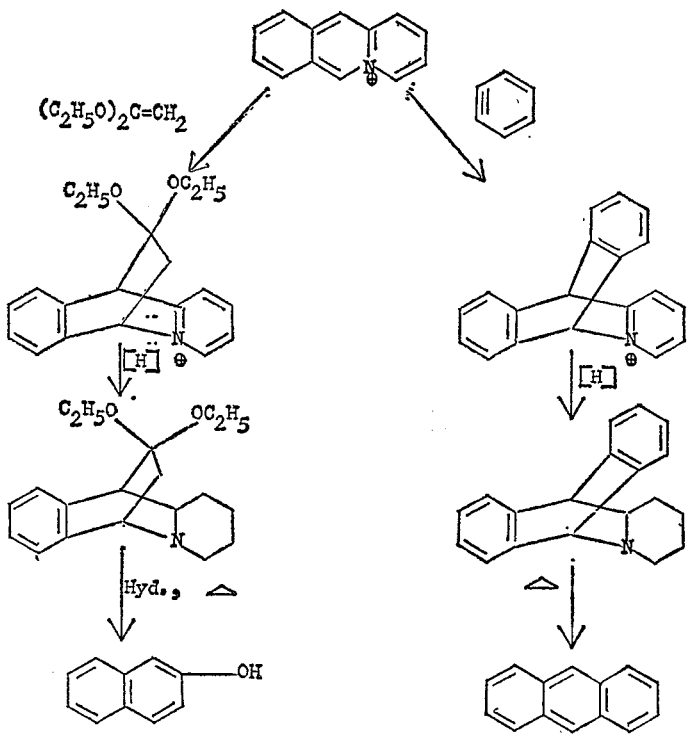

Substituted derivatives are obtained by employing appropriately substituted 4a-azoniaanthracene salts, ketene acetals and benzynes as starting materials.

---

The present invention is concerned with a method for the synthesis of fused ring polycyclic aromatic compounds. More particularly, this invention relates to a method for the synthesis of 2-naphthol and derivatives thereof, anthracene and derivatives thereof, and to a novel class of intermediates therefor. This invention is of particular value for synthesizing complex and/or highly substituted derivatives of 2-naphthol or anthracene which heretofore could be obtained only by very complex synthetic methods.

In general, this invention comprises the synthesis of 2-naphthols or anthracenes from certain novel 9,10-bridged-polyhydro-4a-azaanthracenes by aqueous hydrolysis or thermolysis, respectively. The 9,10-bridged-polyhydro-4a-azaanthracene may be a 9,10-bridged-tetrahydro, a hexahydro, or an octahydro-4a-azaanthracene, the 9,10 carbons of the anthracene nucleus representing two of the hydrogenated positions, and the 1,2,3,4,4a or 9a nuclear atoms representing the remainder of the hydrogenated nuclear atoms. The term polyhydro used hereinafter is intended to represent such hydrogenated 4a-azaanthracenes. The bridged polyhydroanthracenes are in turn prepared from the corresponding 9,10-bridged-9,10-dihydro-4a-azoniaanthracene salts by hydrogenation.

The 9,10-bridged-4a-azoniaanthracene salts which are employed as the starting materials for this invention in general have a cation having a nucleus of the general formula:

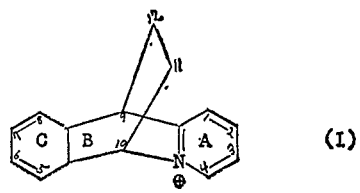

(I)

These compounds may be variously substituted on the cation nucleus, and in general the nature of the substituent is not critical to this invention. Because the A-ring is ultimately lost during the hydrolysis or thermolysis steps of this invention, it is preferred that this ring be unsubstituted. It is not critical whether hydrogenation of the A-ring is complete, although it is necessary that at least partial hydrogenation occurs. In addition, the substituents present on the ethano bridge across the B-ring must include either:

(a) two lower alkoxy groups or a lower alkylenedioxy group attached to the 12-carbon, or
(b) a fused aromatic carbocyclic or heterocyclic ring.

The anion of these salts may be the anion of a strong or moderately strong acid, i.e., an acid which is at least as strong as acetic acid, although inorganic acid anions, such as chloride, bromide, perchlorate and fluoborate ions are preferred.

Preferred 4a-azoniaanthracene cations may be illustrated by the formula:

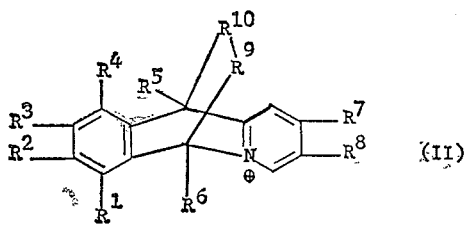

wherein each of $R^1$, $R^2$, $R^3$ and $R^4$ when taken separately, is hydrogen, lower alkyl, lower aryl, lower acyloxy, lower alkoxy, nitro, halogen, lower acylamino, di(lower alkyl) amino; one group of $R^1$ and $R^2$, $R^2$ and $R^3$, and $R^3$ and $R^4$, preferably $R^1$ and $R^2$, and $R^3$ and $R^4$, each group when taken together, represents a fused ring system containing up to three 6-member carbocyclic and nitrogen-containing heterocyclic rings at least one of which is an aromatic ring, and having no more than two nuclear nitrogens in any ring, which may be unsubstituted or substituted with one or more of the substituents defined by $R^1$, $R^2$, $R^3$ and $R^4$; each of $R^5$ and $R^6$, when taken separately is hydrogen, lower alkyl or lower aryl; each of $R^7$ and $R^8$, when taken separately, is hydrogen; $R^7$ and $R^8$, when taken together, represent a fused ring system as defined hereinbefore; $R^9$, when taken individually, is methylene or lower alkyl, lower aryl, lower alkenyl, halogen, or cyano substituted methylene; $R^{10}$, when taken individually, is a protected carbonyl group; $R^9$ and $R^{10}$, when taken together, represent a fused aromatic carbocyclic or heterocyclic ring system, whose valence bonds are from adjacent carbons, containing up to three 6-membered carbocyclic and nitrogen-containing heterocyclic rings having no more than two nitrogens in any ring and which may be substituted with one or more of the substituents defined by $R^1$, $R^2$, $R^3$ and $R^4$.

By the term "lower alkyl" is meant straight or branched chain alkyl groups of up to about 10 carbon atoms, preferably up to about 6 carbon atoms such as methyl, ethyl, propyl, isopropyl, butyl, isobutyl, tert-butyl, pentyl, hexyl, heptyl, octyl, nonyl, decyl and the like, as well as aryl substituted alkyl such as benzyl, phenethyl and the like.

By the term "lower alkoxy" is meant straight or branched chain alkoxy groups having 1 to about 6 carbon atoms such as for example, methoxy, ethoxy, propoxy, isopropoxy, butoxy, isobutoxy, pentyloxy and hexyloxy.

Illustrative of "lower alkenyl" are, for example, vinyl, allyl and propenyl.

By the term "lower acyl" is meant the residue of a lower monohydric carboxylic acid, preferably an alkanoic acid, of up to about 10 carbon atoms, preferably 6 carbons, formed by removal of the hydroxyl of the carboxyl group thereof. Illustrative of "lower acyl" are, for example, formyl, acetyl, propionyl, butyryl, isobutyryl, valeryl, hexanoyl and the like.

Illustrative of lower acylamino are, for example, formamido, acetamido, propionamido, butyramido, valeramido and caproamido.

Illustrative of di(lower alkyl)amino are, for example, dimethylamino, methyethylamino, diethylamino, ethylpropylamino, dipropylamino, diisopropylamino dibutylamino, dipentylamino and dihexylamino.

By the term "halogen" is meant an element of Group VII of the Periodic Table having an atomic number of 17 to 53, inclusive, i.e., chlorine, bromine or iodine, with chlorine or bromine being preferred.

A protected carbonyl group is a ketallized carbonyl group, such as a lower alkylene dioxymethylene group or a di lower alkoxymethylene group of the respective formulae:

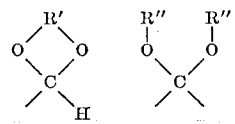

wherein $R'$ is an alkylene group of 2 to about 10, preferably 2 to about 6, carbons which, when taken with the dixoymethylene residue, forms a 5 to 6 membered heterocyclic ring; and each $R''$ is lower alkyl.

Of the 4a-azoniaanthracenes which are substituted on the 5,6- or 7,8-positions with a fused heterocyclic ring system, those wherein the additional ring system comprises a 9,10-di-hydro-9,10-bridged-4a-azonia ring system having a common or adjoining C-ring are preferred. Illustrative of these nuclear structures are the cations of the following formula:

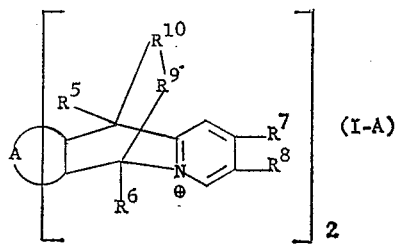

wherein $R^5$–$R^{10}$ are as defined hereinbefore and A together with the two carbon atoms to which it is shown attached forms a benzene nucleus joined to the two N-heterocyclic nuclei indicated through its 1 and 2 and its 3 and 4 carbon atoms, respectively, or a napthalene nucleus joined to the two N-heterocyclic nuclei indicated through its 1 and 2 and its 5 and 6 carbon atoms, respectively, the remaining nuclear carbon atoms of which are unsubstituted or are substituted with lower alkyl, lower aryl, lower alkoxy, lower acyloxy, nitro halogen, lower acylamino or di(lower alkyl)amino.

These compounds may be further classified as 12, 12-dioxy-9,10-ethano-9,10 - dihydro - 4a - azoniaanthracene salts, and 9,10-(o-arylene)-9,10-dihydro-4a-azoniaanthracene salts having cations of the formulae:

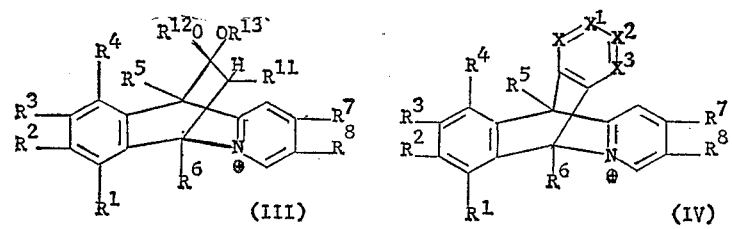

wherein $R^1$ through $R^8$ are as previously defined; $R^{11}$ is hydrogen, lower alkyl, lower alkenyl, lower aryl, halogen or cyano; $R^{12}$ and $R^{13}$, when taken individually, are lower alkyl; and $R^{12}$ and $R^{13}$, when taken together, are lower alkylene; each of X, $X^1$, $X^2$ and $X^3$ is nitrilo or substituted or unsubstituted methylidyne ($=C(R^{14})$—); and $R^{14}$ is hydrogen or an organic substituent such as is defined by $R^1$–$R^4$, $R^7$ and $R^8$, with the proviso that no two adjacent X's are nitrilo.

The corresponding diazonia compounds have cations of the formulae:

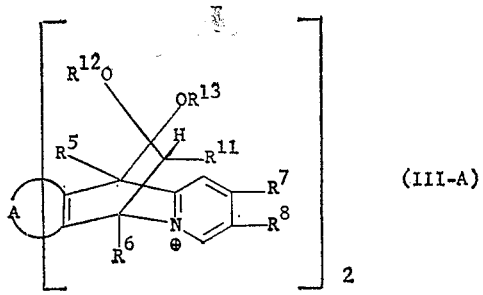

and

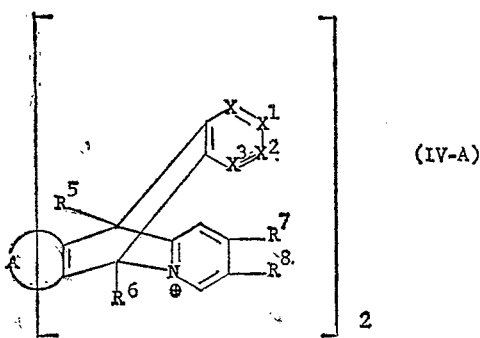

wherein A, $R^5$–$R^8$, $R^{11}$–$R^{13}$, and X, $X^1$, $X^2$ and $X^3$ are as previously defined.

These bridged azoniaanthracene compounds are readily obtained by condensing a 4a-azoniaanthracene salt having a cation of the general formula:

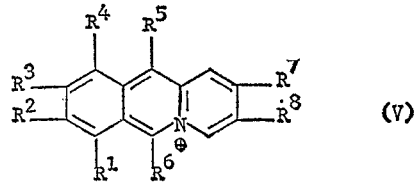

wherein $R^1$–$R^8$ are as defined hereinbefore with a ketene acetal or an aryne compound of the respective formulae:

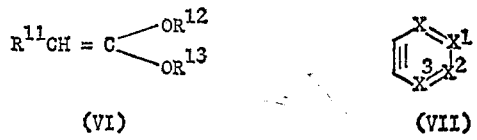

wherein $R^{11}$–$R^{13}$ and X, $X^1$, $X^2$ and $X^3$ are as previously defined.

Preferred arynes are those of the benzyne or 2,3-naphthyne series of the general formula:

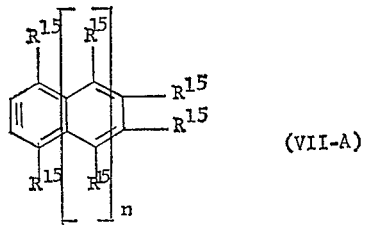

wherein each $R^{15}$, when taken individually, is hydrogen or a substituent as defined by $R^1$–$R^4$ hereinbefore, preferably lower alkyl; and $n$ is an integer having a value of 0 to 1.

This reaction is readily effected at elevated temperatures in a suitable organic solvent. When the ketene acetal (VI) is employed as the co-reactant with the azoniaanthracene salt, the reaction is preferably effected in a polar solvent, such as acetonitrile or dimethylformamide at autogeneous temperatures. On the other hand, when the aryne (VII) is the reactant, the condensation is preferably effected in an aprotic polar solvent, such as acetonitrile and the like, at an elevated temperature, generally in the range of about 50 to 100° C.

Because arynes are unstable compounds, they are generally produced in situ, as by charging an alkyl nitrite and an anthranilic acid of the formula:

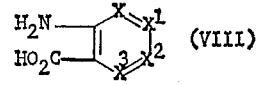

wherein X, $X^1$, $X^2$ and $X^3$ are as previously defined.

In the first step of the process according to this invention, a 4a-azoniaanthracene compound, as defined by Formula II above, is selectively reduced on the A-ring thereof to form a polyhydro-4a-azaanthracene of the general formula:

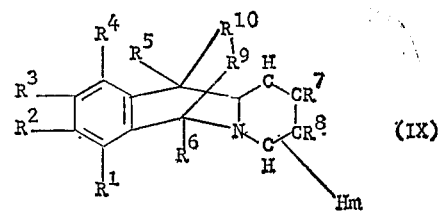

wherein $R^1$–$R^{10}$ are as previously defined and $m$ is an odd integer having a value of from 1 to 5, inclusive.

The corresponding diaza derivatives are illustrated by the formula:

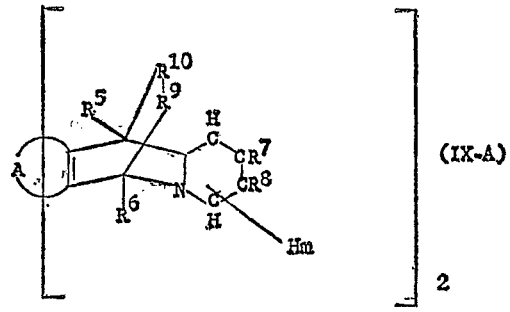

wherein A, $R^5$–$R^{10}$ and $m$ are as previously defined.

The selective reduction of the azoniaanthracene compound to the polyhydroazaanthracene compound may be effected either by catalytic hydrogenation or by chemical reduction, and the extent to which the A-ring of Structure I is hydrogenated depends upon whether catalytic hydrogenation or chemical reduction is employed, as well as the ease of hydrogenation of the particular 9,10-bridged - 9,10-dihydro-4a-azoniaanthracene salt.

Catalytic hydrogenation may be conducted in any suitable manner, and generally results in a completely saturated A-ring. The particular catalysts employed are not critical to this invention, although noble metal catalysts, particularly platinum catalysts, are preferred. In addition, other well known hydrogenation catalysts, such as Raney nickel, can be employed. In addition to the azoniaanthracene starting material and the catalyst, the reaction mixture desirably contains an inert polar liquid reaction medium, for example, water, a lower alcohol such as methanol or ethanol, a carboxylic acid such as acetic acid, an ether such as diethylene glycol dimethyl ether (diglyme) and an ether alcohol such as the monomethyl ether of diethylene glycol (monoglyme), and the like. The reaction conditions are not narrowly critical, although relatively mild conditions are preferred. Thus, hydrogen pressures of up to about 100 p.s.i. and temperatures of about room temperature (20° C. to 25° C.) are generally preferred.

Chemical reduction, which generally results in partial hydrogenation of the A-ring of the 4a-azonia compound (II), may be effected with any of the known chemical reducing agents, such as the alkali metal and/or Group III metal reducing agents. These reducing agents include, for example, sodium or lithium in liquid ammonia; Group III metal hydrides, such as aluminum hydride; complex alkali metal—Group III metal hydrides, such as lithium aluminum hydride and sodium borohydride; and the like. In addition, organo derivatives such as diisobutyl-aluminum hydride, triisopropoxylithium aluminum hydride and the like, may be employed. Although the use of an inert reaction medium is not essential, it is preferred that the chemical reduction be effected in an inert reaction medium. The temperature at which chemical reduction is conducted is not narrowly critical, and room temperature is generally suitable, although higher and lower temperatures may be employed if desired.

The second step of the process of this invention comprises heating the polyhydro compound of Formula IX in aqueous medium to split off the at least partially hydrogenated A-ring.

The reaction conditions required for this step and the resulting product depend upon whether the starting material is a ketal or an arylene compound.

When the starting material is a ketal, the product is a 2-naphthol of the formula:

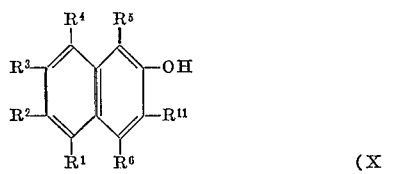

(X)

wherein $R^1$–$R^6$ and $R^{11}$ are as defined hereinbefore.

The corresponding product obtained from a diazaanthracene is a diol of the formula:

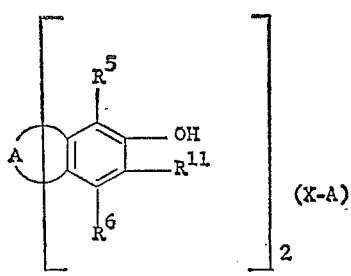

(X-A)

wherein A, $R^5$, $R^6$ and $R^{11}$ are as defined hereinbefore.

On the other hand, when a 9,10-arylene compound is subjected to the second step of the process of this invention there is obtained an anthracene derivative of the formula:

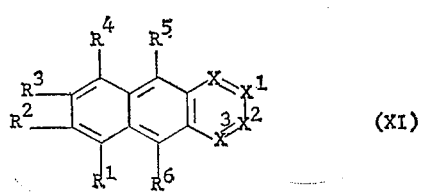

(XI)

wherein $R^1$–$R^6$ and X, $X^1$, $X^2$ and $X^3$ are as defined hereinbefore; or having the formula:

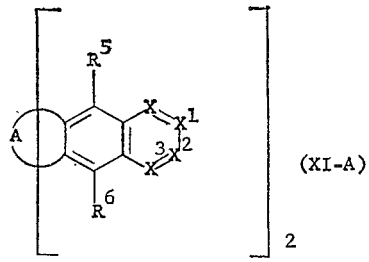

(XI-A)

wherein A, $R^5$, $R^6$ and X, $X^1$, $X^2$ and $R^3$ are as previously defined.

When a ketal is subjected to this heating step the aqueous medium must be acidic. Acidic media are not required, however, when an arylene compound is heated, although the presence of acid is desirable. The particular acid employed is not critical, and any strong or moderately strong acid, i.e., an acid at least as strong as acetic acid, such as those forming the anion of compound (II), can be employed. Preferred, however, are the strong inorganic acids, such as hydrochloric, sulfuric, phosphoric and the like, with hydrochloric acid being especially preferred.

The heating step is desirably effected at temperatures in the range of from about 50° C. to about 150° C., provided sufficient pressure is employed at the more elevated temperatures to maintain a liquid aqueous phase. A convenient method is to effect the reaction at reflux temperatures.

As will be observed, the processes involved herein generally do not affect substituents present on the compounds other than the specific transformations already discussed. One exception occurs, however, when an acyloxy substituent is present. During the heating step of this invention under hydrolytic conditions this substituent is converted to hydroxyl. Transformations of this nature are incidental, however, and in no way affect the essential novel steps of this invention.

The following examples are illustrative:

EXAMPLE 1

A mixture of 5.00 grams of 12,12-diethoxy-11-methyl-9,10 - ethano - 9,10 - dihydro - 4a - azoniaanthracene perchlorate, 400 milligrams of platinum oxide and 100 milliliters of methanol was hydrogenated in a Parr shaker for 18 hours. The initial hydrogen pressure was 65 p.s.i. The reaction mixture was filtered and the solvent was evaporated off, leaving 4.63 grams of white crystalline 12,12-diethoxy - 11 - methyl - 9,10 - ethano - 4a - aza - 1,2,3,4,-4a,9,9a,10 - octahydroanthracene perchloric acid salt.

A solution of 2.54 grams of this product in 20 milliliters of 6 N hydrochloric acid was refluxed for 30 minutes, during which time a white crystalline precipitate formed. After filtration from the reaction mixture and recrystallization from ethanol-water, there was obtained 0.74 gram of 3-methyl-2-naphthol, M.P. 158–160° C.

EXAMPLE 2

To a suspension of 1.00 grams of 12,12-diethoxy-9,10-ethano - 9,10 - dihydro - 9 - phenyl - 4a -azoniaanthracene perchlorate in 30 milliliters of methanol in a separatory funnel, there was added 1.00 gram of sodium borohydride with manual swirling. When gas evolution had ceased, 200 milliliters of water was added. The resulting mixture was extracted with ether and the ether extract was concentrated to a syrup containing 12,12-diethoxy-9,10-ethano-9-phenyl-4a-aza-1,2,3,4,4a,9,9a,10-octahydroanthracene.

A solution of this product syrup in 40 milliliters of 6 N hydrochloric acid was boiled for 3 minutes, during which time an oil separated. Upon cooling, the oil crystallized as white crystals of 1-phenyl-2-naphthol.

EXAMPLES 3-13

Employing procedures similar to those described in Examples 1 and/or 2, several substituted and unsubstituted 12,12 - diethoxy - 9,10 - ethano - 9,10 - dihydro-4a-azoniaanthracene perchlorate salts were hydrogenated to the corresponding polyhydro-4a-azaanthracene, which was then hydrolyzed to the corresponding 2-naphthol. The 2-naphthols which were produced are summarized in the following table:

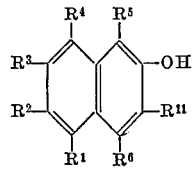

| Example | $R^1$ | $R^2$ | $R^3$ | $R^4$ | $R^5$ | $R^6$ | $R^{11}$ | Hydrogenation process of Ex. |
|---|---|---|---|---|---|---|---|---|
| 3 | H | H | H | H | H | H | H | 1 and 2 |
| 4 | Me | H | H | H | H | H | H | 1 and 2 |
| 5 | H | H | Me | H | H | H | H | 1 and 2 |
| 6 | H | H | H | Me | H | H | H | 1 and 2 |
| 7 | H | H | H | H | H | φ | H | 1 and 2 |
| 8 | Me | H | H | Me | H | H | H | 1 and 2 |
| 9 | H | Me | Me | H | H | H | H | 1 and 2 |
| 10 | HO | HO | H | φ | H | H | H | 1 |
| 11 | AcNH | HO | H | φ | H | H | H | 2 |
| 12 | Me | H | H | H | H | H | Me | 1 and 2 |
| 13 | H | H | H | H | H | H | Br | 2 |

NOTE.—(1) Me=Methyl; φ=phenyl; Ac=acetyl. (2) Hydroxyl groups in Examples 10 and 11 resulted from hydrolysis of acetoxy groups present on the starting dihydro-compound and the intermediate polyhydro-compound.

EXAMPLE 14

Employing procedures similar to those described in Example 2, 14,14 - diethoxy - 13 - methyl - 7,12 - ethano-7,12 - dihydro - 11 - a - azoniabenz[a]anthracene perchlorate was hydrogenated to the corresponding polyhydro compound, which in turn was hydrolyzed to 2-hydroxy-3-methylphenanthrene.

EXAMPLE 15

Employing procedures similar to those described in Example 1, 5, 14:8,13 - diethano - 15,15,17,17 - tetraethoxy - 5,8,13,14 - tetrahydro - 4a,8a,diazoniapentaphene diperchlorate was hydrogenated to the corresponding hexadecahydro compound which, in turn, was hydrolyzed to 3,6-dihydroxyphenanthrene.

EXAMPLES 16 AND 17

Employing procedures similar to those described in Example 2, 6,11 - diaza - 5,14 - ethano - 16,16 - diethoxy-5,14 - dihydro - 4a - azoniapentaphene perchlorate salts were hydrogenated to the corresponding polyhydro compounds, which in turn, were hydrolyzed to products of the formula:

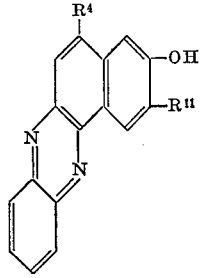

| Example | $R^4$ | $R^{11}$ |
|---|---|---|
| 16 | H | H |
| 17 | t-Bu | Me |

NOTE.—t-Bu=tert-butyl.

EXAMPLE 18

To a suspension of 0.40 gram of 9,10-(o-benzeno)-9,10-dihydro-5-methyl-4a-azoniaanthracene perchlorate in 50 milliliters of methanol there was added 0.40 gram of sodium borohydride. The resulting solution was heated to the boil, cooled, and diluted with 100 milliliters of water. The resulting mixture was extracted with ether to obtain an extract containing 9,10-(o-benzeno)-5-methyl-4a-aza-1,2,3,4,4a,9,9a,10-octahydroanthracene.

The extract was admixed with 200 milliliters of 5 percent hydrochloric acid and refluxed for 5 minutes. On cooling white crystals of 1-methylanthracene separated.

EXAMPLES 19-23

Employing procedures similar to those described in Example 18, substituted and unsubstituted 9,10-(o-benzeno)-9,10-dihydro-4a-azoniaanthracene salts were hydrogenated and then refluxed in hydrochloric acid solution to produce the following products:

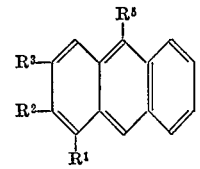

| Example | $R^1$ | $R^2$ | $R^3$ | $R^5$ |
|---|---|---|---|---|
| 19 | H | H | H | H |
| 20 | H | H | Me | H |
| 21 | H | H | H | φ |
| 22 | NO₂ | H | H | H |
| 23 | HO | HO | H | H |

EXAMPLE 24

Employing procedures similar to those described in Example 18, 9,10-(2,3-naphtho)-9,10-dihydro-4a-azoniaanthracene perchlorate was hydrogenated to the corresponding polyhydro compound and heated in dilute hydrochloric acid solution to form naphthacene.

EXAMPLE 25

Employing procedures similar to those described in Example 18, 7,12-(o-benzeno)-7,12-dihydro-11a-azoniabenz(a)-anthracene perchlorate was hydrogenated to the corresponding polyhydro compound and then heated to form benz[a]anthracene.

EXAMPLE 26

Employing procedures similar to those described in Example 18, 5,14:8,13 - di(o-benzeno) - 5,8,13,14-tetrahydro - 4a,8a - diazoniaphenanthrene diperchlorate was hydrogenated to the corresponding hexadecahydro compound which, in turn, was heated to form pentaphene.

The invention has been described in detail with particular reference to preferred embodiments thereof, but it will be understood that variations and modifications can be effected within the spirit and scope of the invention as described hereinbefore and as defined in the appended claims.

What is claimed is:

1. A process for preparing a 2-naphthol compound selected from the group consisting of:

2-naphthol
1-methyl-2-naphthol
3-methyl-2-naphthol
5-methyl-2-naphthol
7-methyl-2-naphthol
3,5-dimethyl-2-naphthol
5,8-dimethyl-2-naphthol
6,7-dimethyl-2-naphthol
1-phenyl-2-naphthol
4-phenyl-2-naphthol
3-bromo-2-naphthol
5-acetamido-6-hydroxy-8-phenyl-2-naphthol and
5,6-dihydroxy-8-phenyl-2-naphthol which comprises heating in an aqueous medium at about 50° C. to about 150° C., at a pressure sufficient to maintain a liquid aqueous phase and in the presence of an acid having an ionization constant of at least $1.75 \times 10^{-5}$, a compound selected from the group consisting of:

12,12-diethoxy-9,10-ethano-4a-aza-1,2,3,4,4a,9,9a,10-octahydroanthracene;
12,12-diethoxy-9,10-ethano-9-methyl-4a-aza-1,2,3,4,4a,9,9a,10-octahydroanthracene;
12,12-diethoxy-9,10-ethano-11-methyl-4a-aza-1,2,3,4,4a,9,9a,10-octahydroanthracene;
12,12-diethoxy-9,10-ethano-5-methyl-4a-aza-1,2,3,4,4a,9,9a,10-octahydroanthracene;
12,12-diethoxy-9,10-ethano-7-methyl-4a-aza-1,2,3,4,4a,9,9a,10-octahydroanthracene;
12,12-diethoxy-9,10-ethano-11,5-dimethyl-4a-aza-1,2,3,4,4a,9,9a,10-octahydroanthracene;
12,12-diethoxy-9,10-ethano-5,8-dimethyl-4a-aza-1,2,3,4,4a,9,9a,10-octahydroanthracene;
12,12-diethoxy-9,10-ethano-6,7-dimethyl-4a-aza-1,2,3,4,4a,9,9a,10-octahydroanthracene;
12,12-diethoxy-9,10-ethano-9-phenyl-4a-aza-1,2,3,4,4a,9,9a,10-octahydroanthracene;
12,12-diethoxy-9,10-ethano-10-phenyl-4a-aza-1,2,3,4,4a,9,9a,10-octahydroanthracene;
12,12-diethoxy-9,10-ethano-11-bromo-4a-aza-1,2,3,4,4a,9,9a,10-octahydroanthracene;
12,12-diethoxy-9,10-ethano-5-acetamido-6-acetoxy-8-phenyl-4a-aza-1,2,3,4,4a,9,9a,10-octahydroanthracene; and
12,12-diethoxy-9,10-ethano-5,6-diacetoxy-8-phenyl-4a-aza-1,2,3,4,4a,9,9a,10-octahydroanthracene, respectively.

2. A process in accordance with claim 1 wherein the reaction is carried out at the reflux temperature of the reaction mixture.

3. A process in accordance with claim 1 for preparing 2-naphthol which comprises heating in an aqueous medium at about 50° C. to about 150° C., at a pressure sufficient to maintain a liquid aqueous phase and in the presence of an acid having an ionization constant of at least $1.75 \times 10^{-5}$, 12,12-diethoxy-9,10-ethano-4a-aza-1,2,3,4,5a,9,9a,10-octahydroanthracene.

4. A process in accordance with claim 3 wherein the reaction is carried out at the reflux temperature of the reaction mixture.

References Cited

UNITED STATES PATENTS

| 3,370,092 | 2/1968 | Kornfeld | 260—558 |
| 3,268,554 | 8/1966 | Bolger | 167—65 |
| 3,272,707 | 9/1966 | Tedeschi | 167—65 |
| 3,375,523 | 3/1968 | Fields et al. | 260—286 |

HENRY R. JILES, Primary Examiner

H. I. MOATZ, Assistant Examiner

U.S. Cl. X.R.

260—267, 290, 293.2, 294, 294.3, 294.7, 295, 296, 297, 469, 562, 576, 577, 612, 618, 623, 645, 649, 650, 668